(12) United States Patent
Boussemart et al.

(10) Patent No.: US 9,271,605 B2
(45) Date of Patent: Mar. 1, 2016

(54) HYBRID APPARATUS FOR PREPARING BEVERAGES

(75) Inventors: Christophe S. Boussemart, Lugrin (FR); Alexandre Kollep, Lutry (CH); Thomas Hodel, Hagendorn (CH); Peter Preisig, Herisau (CH)

(73) Assignee: Nestec S.A., Vevey (CH)

( * ) Notice: Subject to any disclaimer, the term of this patent is extended or adjusted under 35 U.S.C. 154(b) by 484 days.

(21) Appl. No.: 12/811,336

(22) PCT Filed: Jan. 22, 2009

(86) PCT No.: PCT/EP2009/050684
§ 371 (c)(1),
(2), (4) Date: Jun. 30, 2010

(87) PCT Pub. No.: WO2009/092746
PCT Pub. Date: Jul. 30, 2009

(65) Prior Publication Data
US 2010/0282089 A1    Nov. 11, 2010

(30) Foreign Application Priority Data

Jan. 25, 2008  (EP) ................................ 08100917
Mar. 7, 2008   (EP) ................................ 08152433

(51) Int. Cl.
*A47J 31/56*     (2006.01)
*A47J 27/21*     (2006.01)
(Continued)

(52) U.S. Cl.
CPC *A47J 31/56* (2013.01); *A47J 27/21* (2013.01); *A47J 31/005* (2013.01); *A47J 31/54* (2013.01); *A47J 31/545* (2013.01)

(58) Field of Classification Search
CPC ......... A47J 27/21; A47J 31/005; A47J 31/56; A47J 31/545; A47J 31/54
USPC ................... 99/281, 288, 300; 392/308, 449; 126/344
See application file for complete search history.

(56) References Cited

U.S. PATENT DOCUMENTS

| | | | |
|---|---|---|---|
| 1,731,226 A | 10/1929 | Stare | 223/361 |
| 2,150,801 A | 3/1939 | Keaton | 219/43 |
| 2,507,666 A | 5/1950 | Goldthwaite | 219/37 |

(Continued)

FOREIGN PATENT DOCUMENTS

| | | |
|---|---|---|
| DE | 29917036 U1 * | 12/1999 |
| DE | 299 17 036 | 2/2000 |

(Continued)

OTHER PUBLICATIONS

International Search Report and Written Opinion, PCT/EP2009/050684, mailed Jul. 23, 2009.

(Continued)

*Primary Examiner* — Jianying Atkisson
(74) *Attorney, Agent, or Firm* — K&L Gates LLP (57) ABSTRACT

A device for preparing hot beverages which includes an arrangement for circulating a liquid to a beverage supply exit and a combustion heater, such as a burner, for supplying combustion heat to the liquid that is circulated to the supply exit. The combustion heater can be associated with an electric heater for additionally or alternatively supplying electric heat to the liquid that is circulated to the supply exit or with a heat regulator for controlling the amount of heat supplied to the liquid from the combustion heater, the electric heater or both heaters.

21 Claims, 8 Drawing Sheets

(51) Int. Cl.
*A47J 31/00* (2006.01)
*A47J 31/54* (2006.01)

(56) References Cited

U.S. PATENT DOCUMENTS

| | | | |
|---|---|---|---|
| 3,249,303 A * | 5/1966 | Townsend | 237/8 R |
| 3,916,869 A * | 11/1975 | Dufour | 126/110 R |
| 3,969,610 A | 7/1976 | Ratti et al. | 219/441 |
| 4,067,684 A * | 1/1978 | McInerney | 431/90 |
| 6,459,854 B1 | 10/2002 | Yoakim et al. | 392/479 |
| 6,661,968 B2 | 12/2003 | Beaulieu | 392/471 |
| 6,739,241 B2 | 5/2004 | Long et al. | 99/288 |
| 6,752,069 B1 | 6/2004 | Burke et al. | 99/280 |
| 7,197,367 B2 | 3/2007 | Brinkemper et al. | 700/90 |
| 7,644,649 B2 * | 1/2010 | Dworzak et al. | 99/279 |
| 2003/0037681 A1 | 2/2003 | Zhu et al. | 99/325 |
| 2007/0199452 A1 | 8/2007 | Dworzak et al. | 99/275 |

FOREIGN PATENT DOCUMENTS

| | | |
|---|---|---|
| DE | 198 45 464 | 4/2000 |
| DE | 199 24 279 | 11/2000 |
| EP | 0 512 468 | 11/1992 |
| EP | 0 512 470 | 11/1992 |
| EP | 0 602 203 | 6/1994 |
| FR | 2 326 898 | 5/1977 |
| FR | 2 367 465 | 5/1978 |
| FR | 2367465 A * | 6/1978 |
| GB | 706 866 | 4/1954 |
| JP | 60205131 | 10/1985 |
| WO | WO 95/34236 | 12/1995 |
| WO | WO 2004/006742 | 1/2004 |
| WO | WO 2004/098360 | 11/2004 |
| WO | WO 2006/029763 | 3/2006 |
| WO | WO 2006/102980 | 10/2006 |
| WO | WO 2007/027379 | 3/2007 |

OTHER PUBLICATIONS

International Search Report and Written Opinion, PCT/EP2009/050682, mailed Apr. 17, 2009.

* cited by examiner

HYBRID APPARATUS FOR PREPARING BEVERAGES

This application is a 371 filing of International Patent Application PCT/EP2009/050684 filed Jan. 22, 2009.

FIELD OF THE INVENTION

The present invention relates to an apparatus for preparing beverages. The invention more precisely relates to dispensing machines, such as mobile or portable coffee machines.

For the purpose of the present description, a "beverage" is meant to include any liquid food, such as tea, coffee, hot or cold chocolate, milk, soup, baby food, etc. . .

BACKGROUND ART

The beverage preparation apparatuses of the coffee machine type which use prepacked or non-packed portions of a food substance are very widespread among private individuals, and also in municipalities, shopping centres and companies. The preparation principle is based on the extraction of portions of the substance by the passage through this substance of a quantity of cold or hot liquid under high pressure, typically a pressure above atmospheric pressure. The prepacked portions can be partially rigid capsules, or else flexible bags, which are hermetically sealed or partially open, or else a dose filter.

An example of a capsule is described in patent EP 0 512 468 B1. An example of a bag is described in patent EP 0 602 203 B1.

Such extraction systems have many advantages. On the one hand, the individual packages are easy to use and require no batching of coffee or other substances, in the machine. The user places a capsule, a ground-coffee dose or other portions in the machine, then presses a button to start extraction. On the other hand, the individual packages are batched to deliver a beverage, like a coffee, having the desired characteristics such as sufficient character, flavour, foam or other important attributes. When they are impermeable, they usually preserve the freshness of the substance better, up to the time of extraction. Finally, the preparation conditions, such as the temperature, pressure and extraction time can be better controlled, thereby guaranteeing relatively controlled and constant quality to the consumer.

An example of an extraction method is described in EP 0 512 470 B1.

To extract a beverage under pressure from these portions, of the capsule or other type, it is necessary to use a relatively powerful water pump such as an electric compressor and electric heating elements that require significant amounts of electric power to heat water to the appropriate temperature for preparing hot beverages. These pumps and heating elements are usually supplied with electric energy from the mains.

It is therefore difficult to move these preparation apparatuses, for example on a trolley or simply by carrying them. In fact, it would be an advantage to be able to make these apparatuses more mobile so as to offer beverages in locomotion means such as the train, plane, or in certain places such as cinemas, theatres, and also in public places such as beaches, parks, poolsides and other public or private places.

U.S. Pat. No. 6,739,241 discloses a camping drip coffee maker in which a water is promoted from a reservoir to a brewing basket via a tube by heating the tube with an open flame heater to cause pressurisation of the water therein, whereby the boiling/evaporating water is promoted to the brewing basket. Whereas this type of flame heating of the water may prove to be convenient to circulate boiling/evaporated water under the effect of pressure for the purpose of making drip coffee, this heating system is not appropriate to be adapted to prepare an espresso. Indeed, the water which is pumped, usually mechanically, under pressure through ground coffee to prepare an espresso coffee is preferably maintained at a controlled temperature, typically at a temperature within a range of a few degrees around 85° C.

WO2006/102980 discloses an espresso machine that can be operated to prepare beverages without being connected to an electric power network. The machine is powered with a battery. To avoid extensive use of the battery to heat water used for the preparation of the beverages, the espresso machine has a thermally-insulated reservoir containing water that is preheated using the mains prior to prepare beverages in an autonomous mode. The water is then maintained at a sufficient temperature using the battery in the autonomous mode. The autonomy of such beverage machines can be of a few hours and thus provides a solution when their use is intended within a relatively short period from the time after the water has been preheated, for instance in trains, planes, cinemas . . . . However, this machine is not optimal when intended to be used only several hours or days after preheating the water.

US2007/0199452 discloses a mobile or portable espresso machine in which water is pumped from a reservoir by means of a pressure gas actuated pump. The water is heated in the reservoir (in which case the reservoir is insulated) or between the reservoir and the machine's extraction head. The espresso machine has either an electric heater, such as a thermoblock, or a combustion heater such as a burner using solid and/or gaseous and/or liquid fuel.

More generally, a fuel gas burner that may be used for cooking is disclosed in WO 2007/027379.

Even though combustion heaters may constitute an interesting alternative to electric heating for certain type of mobile or portable coffee machines, the known use of a combustion heater leads to boiling and/or evaporation of the water, which is not desirable for the preparation of espresso-type coffee or even tea. Moreover, such combustion heaters are sometimes not well accepted when the coffee machine is also intended to be used at proximity of the electric power supply, in particular at home.

Therefore, there is still a need to provide a handy mobile or portable espresso-type beverage machine that can be used to prepare beverages at home, in an office or even in the absence of an electric power network (mains) and which is suitable to prepare hot beverages from a liquid heated at a controlled temperature.

SUMMARY OF THE INVENTION

The invention therefore relates to a device for preparing hot beverages, in particular coffee or tea, comprising: an arrangement for circulating a liquid from a liquid supply, e.g. a water supply, to a beverage supply exit; and a combustion heating means, such as a burner, for supplying combustion heat to the liquid that is circulated to the supply exit.

The liquid supply may be in the form of a tank of liquid having a capacity that is sufficient for supplying more than one beverage.

In accordance with the invention, the combustion heating means is associated with an electric heating means for supplying electric heat to the liquid that is circulated to the supply exit.

By providing a hybrid coffee machine, which works with a combustion heating means and an electric heating means, the user who does not want to have an appliance that needs a gas supply or another combustion system at home or in the office for example, typically for safety reasons, does not anymore need to buy a separate appliance for going to places, typically outdoor places, where he does not have access to the mains, such as a household or industrial electric power supply providing typically about 110, 220 or 380 volt.

Electric heating means are for instance disclosed in WO 2004/006742 and in WO 2006/029763.

The electric heating means may comprise a thermoblock having a metal-based body with a through passage for the circulation of the liquid and one or more resistances for supplying electric heat to the metal-based body.

Advantageously, the combustion heating means is arranged to supply heat to the liquid via the metal-based body of the thermoblock. Such a metal-based body may comprise a mass of aluminium with a steel passage for the circulation of the liquid, and/or it may form a sufficient thermal capacity that can provide a more or less constant amount of heat to liquid circulating through the thermoblock and absorb possible variations of the combustion heat supply. The metal-based body may have a generally tubular shape with a generally helicoidal through passage for the circulation of liquid.

In order to adjust the temperature of the liquid, in particular in the range of 70 to 95° C., such as around 85° C. for preparing a espresso coffee, the combustion heating means and/or the electric heating means is/are preferably associated with a means for regulating the heat supplied to the liquid from the combustion heating means and/or the electric heating means, the regulating means comprising usually a temperature sensor.

In a first embodiment, the electric heating means is associated with a temperature sensor that is arranged to measure directly or indirectly the temperature of the heated liquid. In this case, the electric heating means is arranged to: compare the measured temperature with a target temperature; and adjust the supply of electric heat based on the difference between the measured temperature and the target temperature. In this configuration, the combustion heating means may be arranged to supply an amount of combustion heat to the liquid which is below the heat required for the liquid to reach the target temperature but does not need to be further regulated since the required heat for the liquid to reach or approach the target temperature is provided by the electric heating means.

In another embodiment, the combustion heating means is associated with a temperature sensor that is arranged to measure directly or indirectly the temperature of the heated liquid. In this case, the combustion heating means is arranged to: compare the measured temperature with a target temperature; and adjust the supply of the combustion heat based on the difference between the measured temperature and the target temperature. In such a situation, the electric heating means may be arranged to supply electric heat to the liquid which is below the heat required for the liquid to reach the target temperature but does not need to be further regulated since the required heat for the liquid to reach or approach the target temperature is provided by the combustion heating means.

In a further advantageous embodiment, the electric heating means and the combustion heating means are associated with a temperature sensor, optionally the same temperature sensor for both heating means, that is arranged to measure directly or indirectly the temperature of the heated liquid. In this case, the electric heating means and the combustion heating means can be arranged to: compare the measured temperature with a target temperature; and adjust the supply of electric heat and/or combustion heat based on the difference between the measured temperature and the target temperature.

The regulating means may also comprise a flow meter to monitor not only the temperature of the heated liquid but also the flow rate, and thus the amount of liquid that requires heating.

The electric heating means and the combustion heating means may be configured or configurable, in particular by the user, so that: the electric heating means and the combustion heating means supply heat simultaneously to the liquid; or only one at a time of the electric heating means and the combustion heating means supplies heat to the liquid.

The combustion heating means may comprise a combustible supply arrangement for supplying combustible material to a burner for consuming the combustible material. The combustible material may be a solid and/or gaseous and/or a liquid fuel, that can be subjected to a flame burning. However, by incorporating an appropriate catalytic device in the burner, flame formation during burning may be significantly inhibited or even substantially suppressed, as will be discussed in greater details below. The combustible supply arrangement may include a combustible supply reservoir or tank, or a connector to a combustible supply network, in particular for gas.

Usually, the combustion heating means further comprises a valve between the combustible supply arrangement and the burner for controlling the supply of combustible material from the supply arrangement to the burner, in particular a variable valve, e.g. allowing the passage of a variable flow of combustible, or a two state on-off valve, e.g. a valve that merely has an open and a closed position for controlling the flow of gas.

In such a case, the combustion heating means is advantageously associated with means for regulating its heat supply, the regulating means being arranged to control the valve. When the valve is an on-off type of valve, the regulating means can be arranged to control the periods of time during which the heating means supply heat and, respectively, do not heat the liquid. When the valve is a variable valve, the regulation means is preferably arranged further to control the supply rate of the combustion material for the heating, for instance the gas flow to the burner.

One should bear in mind that each time the combustion heating means is interrupted, it must be reignited to further supply heat.

Usually, the combustion heating means is associated with an ignition means, in particular an electric ignition means. For the above reason, such an ignition means is preferably controlled by the regulation means.

It is also possible to provide two parallel on-off vales, i.e. a first valve for providing a minimum supply of combustible to maintain a continuous or substantially continuous combustion and a second valve for adjusting the heating power by intermittently opening and closing as needed. In this case, there are no or fewer combustion interruptions and no or fewer combustion reignitions.

The arrangement for circulating a liquid comprises a pump for promoting the circulation of the liquid in the arrangement, in particular under pressure, e.g. up to 30 bar, such as in the range of 1.5 to 25 bar, for instance 10 to 20 bar, typically to prepare an espresso-type beverage. The pump may be electrically powered and/or gas actuated, for instance a gas actuated pump as disclosed in US2007/0199452.

The beverage preparation device is typically arranged to be powered with an electric current supply that can be at least one of a battery-type low voltage supply and the mains. The device may comprise a housing for a battery and/or a connector for a low voltage supply, for instance connectable to a cigarette lighter type car connector.

The beverage preparation device may be arranged for operation with electric heating when powered by the mains and with combustion heating when powered by the battery-type low voltage supply.

When the beverage preparation device has an electrically powered pump, electric regulation means or other electric components, a battery may be sufficient to power satisfactorily such components when the heating is primarily provided by the combustion heating means. In fact, when hot beverage preparation devices are powered solely by an electric energy, the electric heating requires about 95% of the consumed electric energy. Therefore, it may be an advantageous combination for the autonomy of the device while allowing a fine control of the temperature of the liquid to provide a beverage preparation device with a combustion heating means and an electric temperature regulation means and pump, powered by a battery or another low voltage electric supply.

The arrangement for circulating the liquid may comprise an extraction and/or infusion head for containing an ingredient for the preparation of the beverage, the extraction head leading to the supply exit. The ingredient may be provided in the form of a prepacked portion in a container such as a cartridge, bag, or other appropriate packaging means. Alternatively, the ingredient can be provided in the form of a non-packed portion, such as ground coffee, directly introduced into the chamber of the extraction module.

The invention also relates to a device for preparing hot beverages, in particular coffee or tea. This device comprises: an arrangement for circulating a liquid, such as water, from a liquid supply to a beverage supply exit; and a combustion heating means, such as a burner, for supplying combustion heat to the liquid that is circulated to the supply exit. In accordance with the invention, the combustion heating means is associated with a means for regulating the heat supplied to the liquid from the combustion heating means, the regulating means comprising usually a temperature sensor.

The regulating means may in particular be associated with a temperature sensor that is arranged to measure directly or indirectly the temperature of the heated liquid. In such a case the regulating means can be arranged to: compare the measured temperature with a target temperature; and adjust the supply of combustion heat by the combustion means based on the difference between the measured temperature and the target temperature.

This beverage preparation device may incorporate all the above disclosed features or combination of features. In particular, the combustion heating means is associated with an electric heating element for supplying an electric heat to the liquid that is circulated to the supply exit.

While the disclosed beverage preparation device is particularly advantageous for providing mobile or portable devices that may be suitable for inside and outside use, at home or out of home, such a beverage preparation device may also be used as a fixed device, for instance in a place with a combustible, in particular gas, supply network to which the beverage preparation device may be conveniently connected.

Another aspect of the invention relates to a device for heating a liquid such as water, in particular a device for cooking or for incorporation into a device for preparing a beverage as described above. However, the device may also be designed for use on a self-standing basis. The heating device comprises: an arrangement for containing a liquid to be heated; and a combustion heating means for supplying combustion heat to the liquid within the arrangement. The combustion heating means comprises an arrangement for supplying combustible from a source of combustible to a combustion area.

For example, the heating device is a device to dispense hot water and/or is incorporated in a beverage preparation device to heat water, or another liquid, used in the beverage preparation process as discussed above. For instance, the heating device is arranged to heat the liquid to the desired temperature for the beverage preparation process or to preheat the liquid and circulate it to an in-line heater such as an electric heater to adjust the temperature for the beverage preparation process.

In accordance with the invention, the combustion heating means further comprises within and/or adjacent to the combustion area a catalytic device for inhibiting flame formation by combustion of the combustible.

Such a flameless or flame-inhibited combustion may reduce the combustion noise during heating and also prevents the formation of undesirable and possibly dangerous flames extending out of the heating device, especially when an elevated heating power is needed.

Typically, the catalytic device becomes active for inhibiting flame formation upon preheating thereof, for instance when it becomes incandescent. In this case, the arrangement for supplying combustible to the combustion area may comprise a control means for supplying combustible to the combustion area at a low rate during preheating of the catalytic device, when combusting still produces flames, and at a high rate upon preheating of the catalytic device, when combustion produces substantially no flames.

The heating device may have a housing containing the combustion area and one or more passages, such as chimneys, in particular extending along the arrangement for containing the liquid to be heated, for evacuating combustion gases from the combustion area to outside the housing. In this case, the low rate of supply of combustible is preferably such that combustion flames generated during preheating of the catalytic device are at least inhibited from extending outside the housing via the passages.

During preheating, the heating device may be arranged to measure directly or indirectly a temperature of the catalytic device to monitor whether or not the catalytic device has reached its temperature at which it becomes active. For example, the heating device includes a temperature sensor at or nearby the catalytic device. In a simpler embodiment, the heating device can be arranged to estimate by a predictive model the activation of the catalytic device, for instance a model based on experimental results. In particular, the length of a particular preheating period at low combustion supply rate may be set as a function of the time span from a previous heating cycle, the longer the time span between two consecutive heating cycles the longer the preheating period. In this case, the preheating period is maximal when the device is used for the first time for heating after having been switched on.

Usually, the combustion heating means comprises at least one combustible supply conduit associated with a control valve to adjust a rate of supply of combustible to the combustion area via the supply conduit.

Such a control valve may be a variable valve. In this case, during preheating, the flow rate via this valve may be gradually increased in accordance with the degree of activation of the catalytic device, when the catalytic device has a temperature-related progressive activity.

The combustion heating means may comprise a plurality of combustion supply conduits, each conduit being associated with a corresponding control valve, in particular an on-off control valve. In this case, only one or part of the control valves may allow the passage of combustible to the combustion area during preheating to maintain a low overall flow rate of combustible to the combustion area.

A common combustion supply conduit can be associated with a plurality of control valves, in particular parallel valves, the outlets of which join in or upstream the common combustion supply conduit. In a variation, the common combustion supply conduit may be replaced by a plurality of common combustion conduits having their inlets in fluid connection, the outlets of the valves being directly or indirectly connected to the connected conduit inlets. In this case, the distribution of the combustible delivered by the supply conduits to the combustion area may be improved.

The catalytic device may have a porous, foraminate, perforated or grid-like structure, in particular a plate-like structure, arranged for a flow of said combustible therethrough. The catalytic device can have an active surface made of or comprising one or more noble metals as a catalyst, for instance the catalytic device is integrally made of active material or has a core with a coating or layer of active material where exposed to a flow of combustible. Suitable catalytic materials include, for example, Metflame™ A supplied by Infrared Dynamics, Metflame™ PB10 provided by Porvair Advanced Materials, catalytic materials from Catalytic Combustion Corporation in Bloomer, Wis. 54724, USA, and from Oglesby Butler in Carlow, Ireland.

For certain applications, in particular the preparation of beverages such as coffee of tea, the temperature of the heated liquid should be specifically adjusted to the specific application and maintained within a relatively narrow span, say at a selected temperature level in a range below the boiling point of e.g. 35 to 95° C., in particular 65 to 90° C., within a maximum temperature deviation of +/−2 to 3° C. around the selected temperature. The arrangement for containing a liquid to be heated may include a temperature sensor for directly or indirectly measuring the temperature of the liquid, e.g. water, during heating thereof and an arrangement for adjusting the combustible supply rate to the combusting area to heat the liquid to the selected target temperature. Hence, the control means for supplying combustible is further arranged for adjusting the combustible supply to heat said liquid to said target temperature. Such a supply adjustment may be carried out by means of a valve allowing a variable flow rate or by means of several conduits, each associated with a corresponding (on-off) valve and which may be operated independently from one another to allow fine tuning of the combustion.

The heating device of the invention may incorporate any suitable feature or combination of features disclosed in relation with the above described beverage devices.

BRIEF DESCRIPTION OF THE DRAWINGS

The invention will now be described with reference to the schematic drawings, wherein:

FIGS. 7 to 12 show various schematic views and details of an embodiment of a liquid heating device which may be implemented into a beverage preparation device according to the invention.

More particularly.

DETAILED DESCRIPTION

Figure 1:
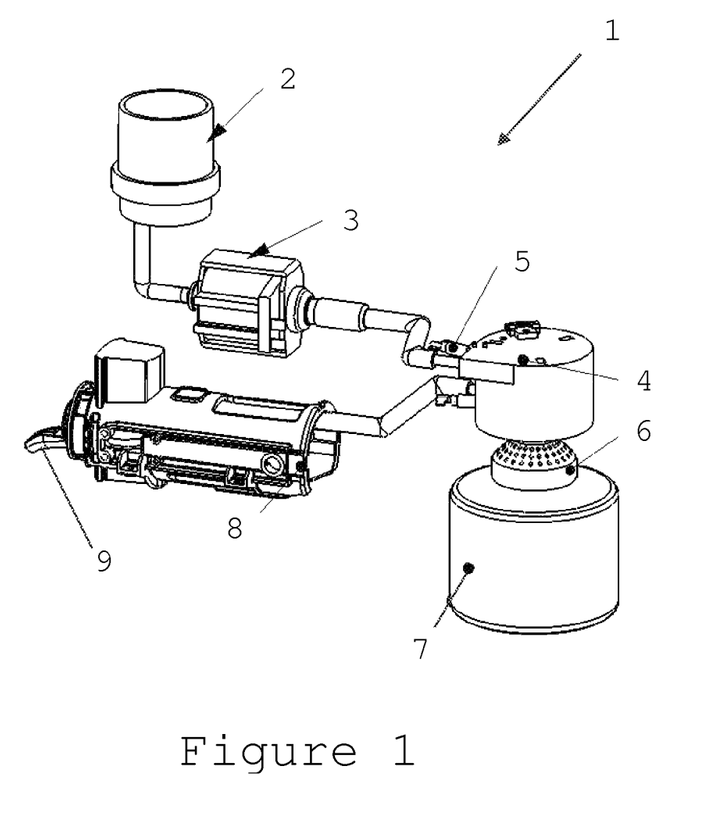
FIG. 1 shows a schematic arrangement of components of a beverage preparation device according to the invention.

FIG. 1 discloses a water circulation and heating system 1 of a liquid beverage preparation device, in particular a coffee, espresso and/or tea preparation machine, in accordance with the invention.

System 1 comprises a reservoir 2 for containing the liquid, in particular water, a pump 3 for promoting the circulation of the liquid, in particular under pressure, a thermoblock 4 with an electric thermal resistance 5 and a burner 6 with a combustible tank 7 for heating the circulating liquid and an extraction head 8 with a beverage supply exit 9.

Thermoblock 4 has a mass of metal, in particular an aluminium body incorporating a steel passage such as a steel tube extending through the body, through which the liquid is circulated from pump 3 towards extraction head 8 and thereby appropriately heated. This thermoblock's mass forms a thermal capacity to smooth or absorb the effect of variable heat supply by resistor 5 or burner 6 and/or variable heat consumption by the circulating liquid. However, in order to limit the thermal inertia the amount of material of metal mass 41 is limited by the presence of a central through-opening that can be provided through mass 41 (see in particular FIGS. 3 and 5).

As shown in FIG. 1, burner 6 is associated with thermoblock 4 and arranged to supply a combustion heat to the circulating liquid via thermoblock 4 by supplying combustion heat to the bottom part of thermoblock 4.

Thermoblock 4 is so arranged above burner 6 to be heated by the consumption of combustible at burner 6, when the burner is in use. Hence, burner 6 is arranged relative to thermoblock 4 so as to maximise heat transfer from the consuming combustible to thermoblock 4 and therefrom to the circulating liquid.

Furthermore, resistor 5 and combustible heater 6,7 are associated with a thermal regulator (not shown). The regulator includes a temperature sensor arranged to measure the temperature of the heated liquid, for instance at the liquid exit of thermoblock 4, or within thermoblock 4. The temperature of the thermoblock's metal mass may be measured in order to obtain an indirect measure of the temperature of liquid. The regulator further comprises a control unit, e.g. including a controller or microprocessor, connected to the temperature sensor for comparing the measured temperature to a target temperature. The control unit is further connected: on the one hand, to an electric valve and an electric ignitor of burner 6 for controlling the supplied combustion heat; and, on the other hand, to an electric switch or variator connected to resistor 5 for controlling the supplied electric heat. To allow a finer regulation of the temperature of the circulating liquid, the thermal regulator may be associated with a flow meter 55 to measure the flow rate of the circulated liquid and determine precisely the required heat for heating the circulating liquid. For regulating the supplied heat, in particular from burner 6, the control unit may include a predictive model to anticipate the required heat for adjusting the temperature of the circulating liquid.

System 1 is further associated with a supply of electric power, from the mains and from a low voltage battery, allowing two modes of electric operations, in a plugged or unplugged mode.

Figure 2:
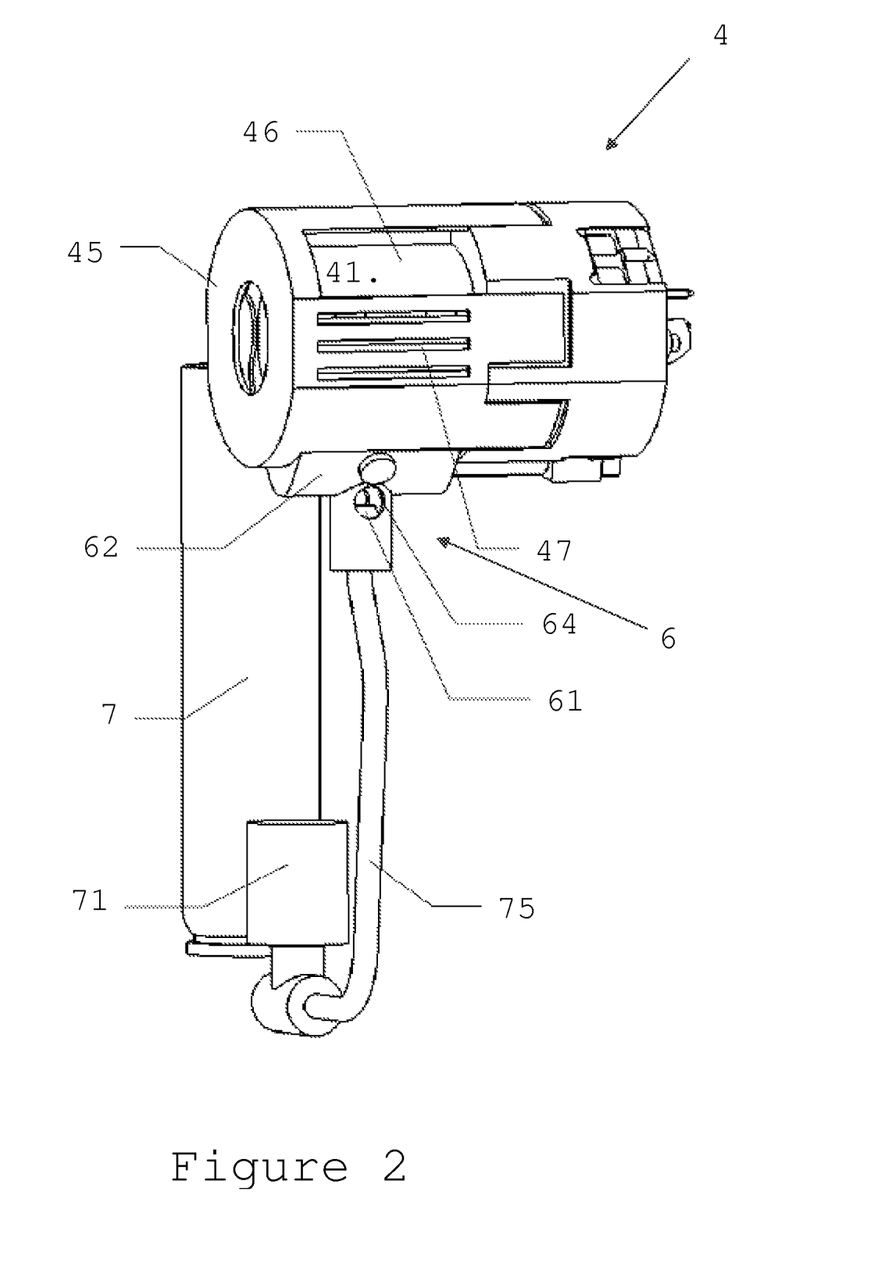
FIGS. 2 to 6 show various details of a heating system of a beverage preparation device according to the invention.
Figure 3:
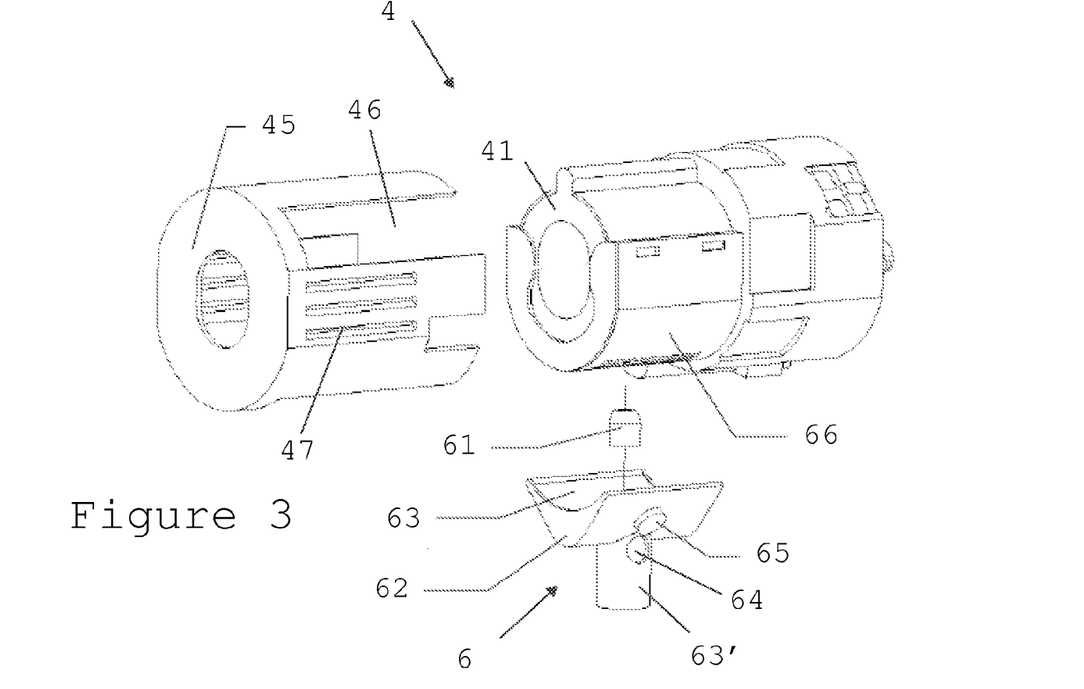
Figures 4, 5:
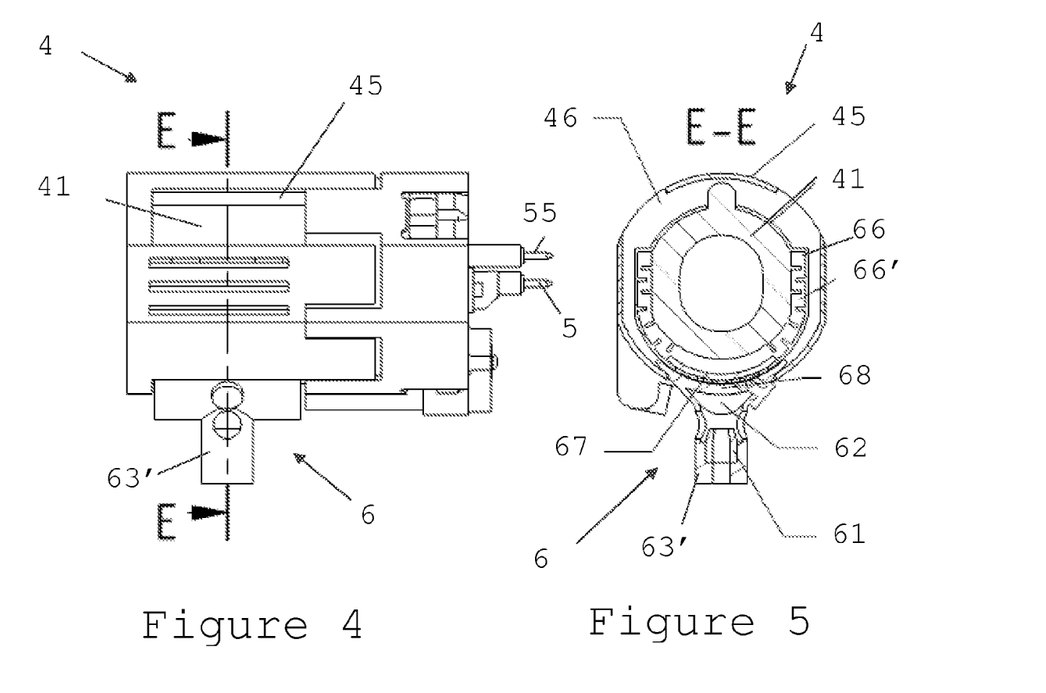
Figure 6:
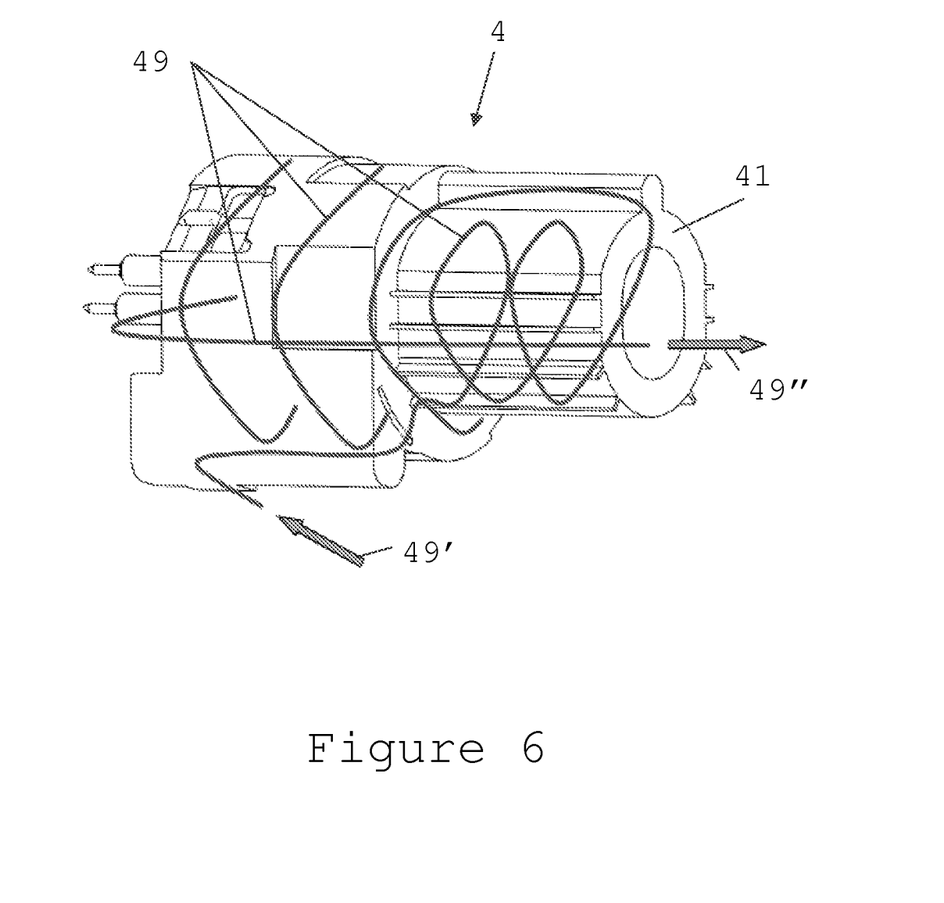
Figure 7:
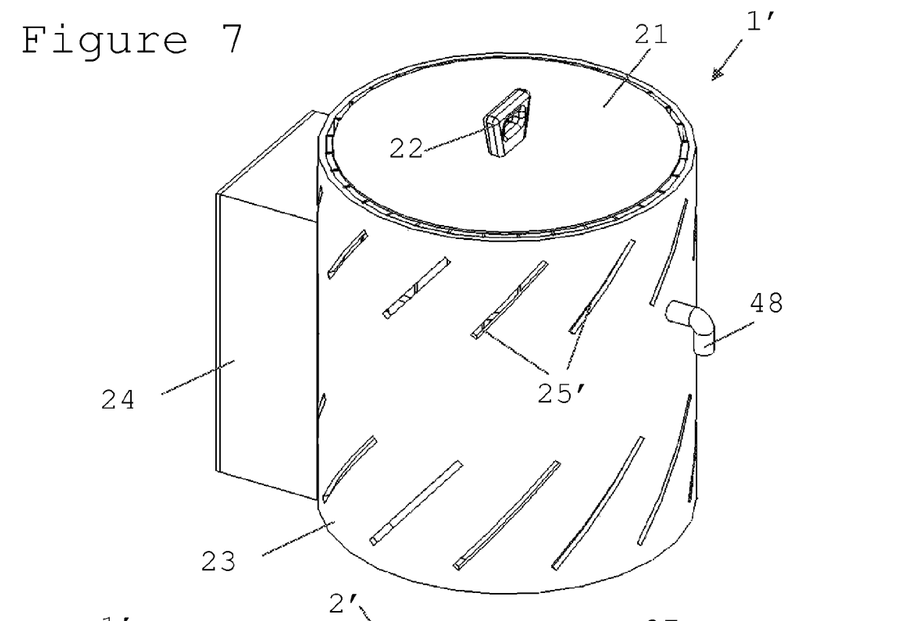
FIGS. 7 and 8 illustrate the external aspect of the heating device (with and without lid)
Figure 8:
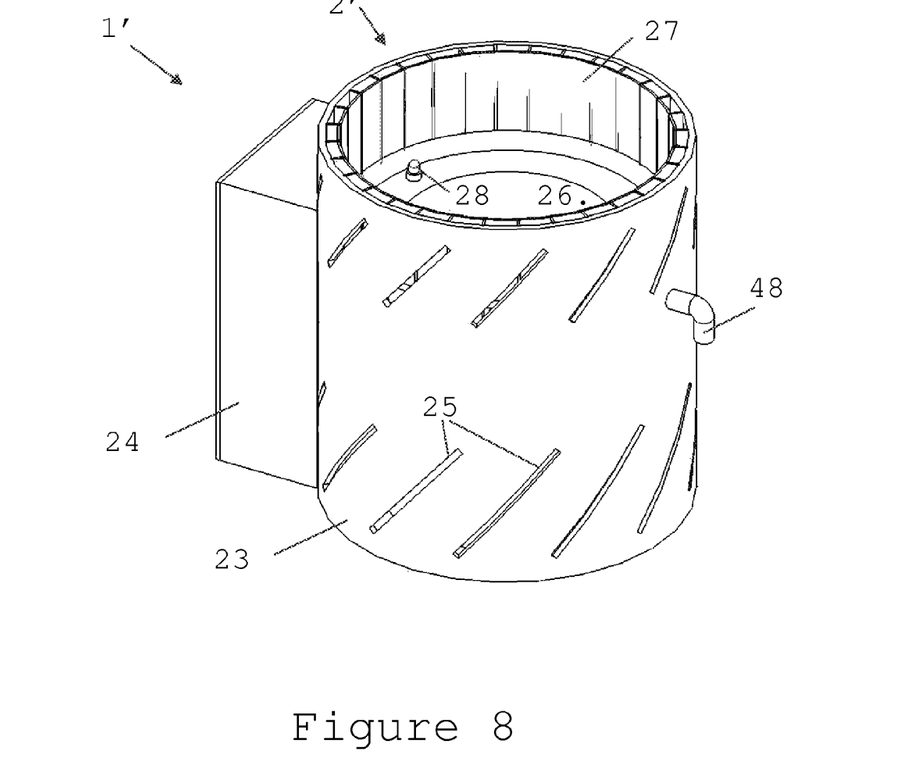

FIGS. 2 to 6, in which the same numeric references designate the same elements, show in greater details a heating system of a beverage preparation device according to the invention. More specifically, FIG. 2 shows a perspective view of the thermoblock 4, burner 6 and combustible tank 7. FIG. 3 is an exploded view of thermoblock 4 and burner 6 shown in FIG. 2. The same structural elements of the heating system are shown in FIGS. 4 and 5, FIG. 4 being a side view and FIG. 5 a cross-sectional view according to line and arrows E-E indicated in FIG. 4. FIG. 6 schematically shows the general flow path of liquid through thermoblock 4.

As shown in FIG. 2, combustible tank 7 is connected via a solenoid valve 71 and duct 75 to burner 6 in order to supply combustible, in particular in the form of gas, to burner 6. The flow of gas from burner 6 is adjusted by the control of solenoid valve 71.

Thermoblock 4 shown in FIGS. 2 to 6 has an inner generally tubular metal mass 41 with a duct (not shown) for the circulation of water to be heated to be heated in thermoblock 5 during use. Metal mass 41 is enclosed in an outer casing 45 made of thermal insulation material. As shown in FIG. 4, metal mass 41 is associated with electric thermal resistance 5, permitting electric heating of thermoblock 4, and sensor connector 55 for measuring one or more a characteristics of thermoblock 4 and/or of the liquid, for example water, circulating therethrough during use, such as the flow rate of the circulating water and/or the temperature thereof and/or of mass 41. Furthermore, a suitable flow path 49 through the thermoblock's metal mass 41 for the liquid to be heated via thermoblock 4 is generally shown in FIG. 6, arrows 49' and 49" indicating the entry and the exit, respectively, of liquid circulating through mass 41. Flow path 49 is generally helicoidal and extends along the periphery of the generally tubular mass 41.

In addition to an electric heater 5, thermoblock 4 is associated with a combustible heater 6, in the form of burner, as depicted in FIGS. 2 to 5. Burner 6 connected at the end of gas supply duct 75 extends into thermoblock 4 through outer casing 45. The upper part of outer casing 45 has a pair of openings 46 for the exit of exhaust combustion gases and a series of lateral openings 47, in the form of slits, for the passage of air.

Burner 6 has a combustible distribution chamber 62 with a generally V-shaped cross-section 63 that generally matches the lower part of thermoblock 4 and that leads via a tubular connector 63' containing a burner nozzle 61 to duct 75, nozzle 61 being located at the bottom of distribution chamber 62 and extending therebelow. An opening 64 is provided for the passage of air through tubular connector 63' to burner nozzle 61. A metal sheet 66 for conducting heat, for example made of brass, extends around a bottom part of metal mass 41. Conductor sheet 66 and metal mass 41 having therebetween a heat exchanger 66' for transferring combustion heat to metal mass 41. Also shown in FIG. 5, burner nozzle 61 and distribution chamber 62 are covered with a porous protective inlay 68 against fire backlash. Inlay 68 is itself covered with a porous catalyser layer 67 for the combustion. Burner nozzle 61 is further associated with an ignitor 65 for igniting combustion. Ignitor 65 extends through distribution chamber 62.

During use of system 1 to prepare a beverage, liquid is pumped from reservoir 2 by pump 3, usually electric, via thermoblock 4 to extraction head 8 and through a batch of beverage ingredient, in particular a coffee or tea capsule or pod housed in head 8, and then to beverage exit 9 where the beverage can be collected in a recipient, in particular in a cup or mug, located thereunder.

In the plugged mode, system 1 is connected to the mains and the heat is provided electrically by resistor 5. In this mode, system 1 can be operated and regulated like in known beverage preparation devices.

In the unplugged mode, system 1 is electrically powered by a low voltage battery (not shown) that supplies electric energy to pump 3, to the regulator, to the electric valve and the ignitor 65 of burner 6. In this unplugged mode, the regulator controls the burner's valve and ignitor 65 to adjust the combustion heat transferred to the circulating liquid via thermoblock. More specifically, during use, gas, or another suitable combustible, is guided from tank 7 along duct 75 via valve 71 to burner nozzle 61 where it is mixed with air passed to nozzle 62 via opening 64. The mixture is then distributed in distribution chamber and circulates via porous inlay 68 to porous catalyst 67 where the mixture is consumed. The hot combustion gases flow around metal mass 41 to exhaust openings 46 in the thermal insulating casing 45.

Whether the system is operated in the plugged or unplugged mode, the electric and/or combustion heat is passed from metal mass 41 to the water circulating in mass 41 along flow path 49 in a duct (not shown) extending through mass 41. The duct of metal mass 41 normally has a water inlet that leads incoming water coming from pump 3 into mass 41 and a water outlet that guides exiting water from mass 41 to extraction head 8. Such water inlet and outlet may be located on the same face of metal mass 41 or on different faces, for instance opposite faces, of mass 41.

In a variation, electric resistor 5 and burner 6 may be used in the same beverage preparation cycle to increase the produced heat and/or provide a finer adjustment of the temperature.

FIGS. 7 to 12 in which the same numeric references generally designate the same elements, show a particular device 1' for heating a liquid such as water, in particular for incorporation into a device for preparing a beverage similar to the one described above. However, the device may also be designed for use on a self-standing basis for cooking or for dispensing hot water, e.g. for a subsequent preparation of instant coffee or tea or soup, or an infusion, etc. . . . in a cup.

Heating device 1' comprises within a housing 23: an upper arrangement, such as a vessel 2', for containing a liquid to be heated 2; an intermediate combustion heater 6' for supplying combustion heat to the liquid within arrangement 2'; and a lower cavity 7' for receiving a combustible tank 7. Furthermore, housing 23 has a side compartment 24 containing electric supply arrangement, such as a series of batteries or an accumulator 51 or alternative a connector device to the mains or to a car accumulator for instance via a cigarette lighter, and a printed circuit board 52 with a controller forming an electric control unit of heating device 1'. Printed circuit board 52 may be connected to a user-interface (not shown) for instance mounted on compartment 24 or elsewhere, as appropriate.

Vessel 2' has a bottom 26, sidewalls 27 and a lid with a handle 22. Lid 21 may have a thermal insulation. For filling vessel 2' via its mouth with water, lid 21 will of course be removed. For dispensing water from vessel 2' a tubular conduit is provided. In this embodiment, tubular conduit 48 extends from a bottom region of vessel 2' downwards so as to guide liquid out of vessel 2' under the effect of gravity. A downstream valve (not shown) may be mounted on tubular conduit 48 to control the outflow of liquid.

Figure 9:
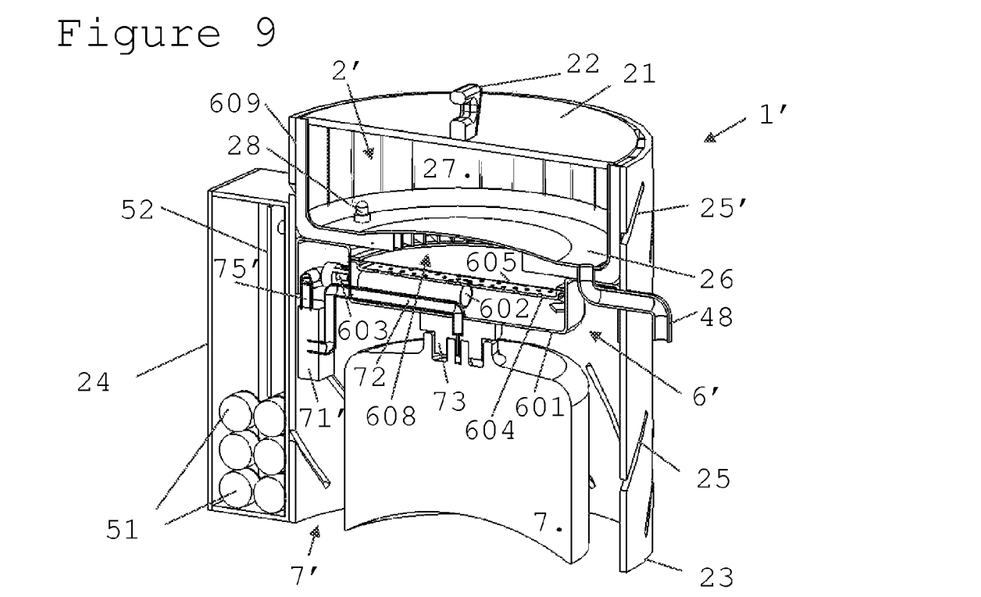
FIG. 9 shows a side perspective view of part of the inside of the device.
Figure 10:
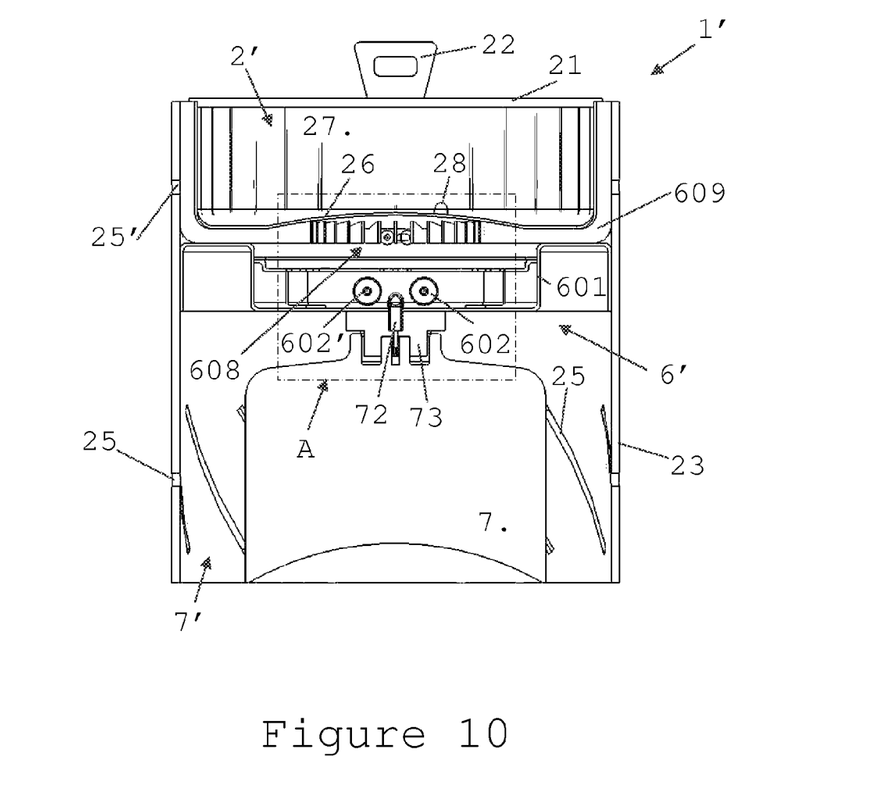
FIG. 10 shows a front cross-sectional view of the device.
Figure 11:
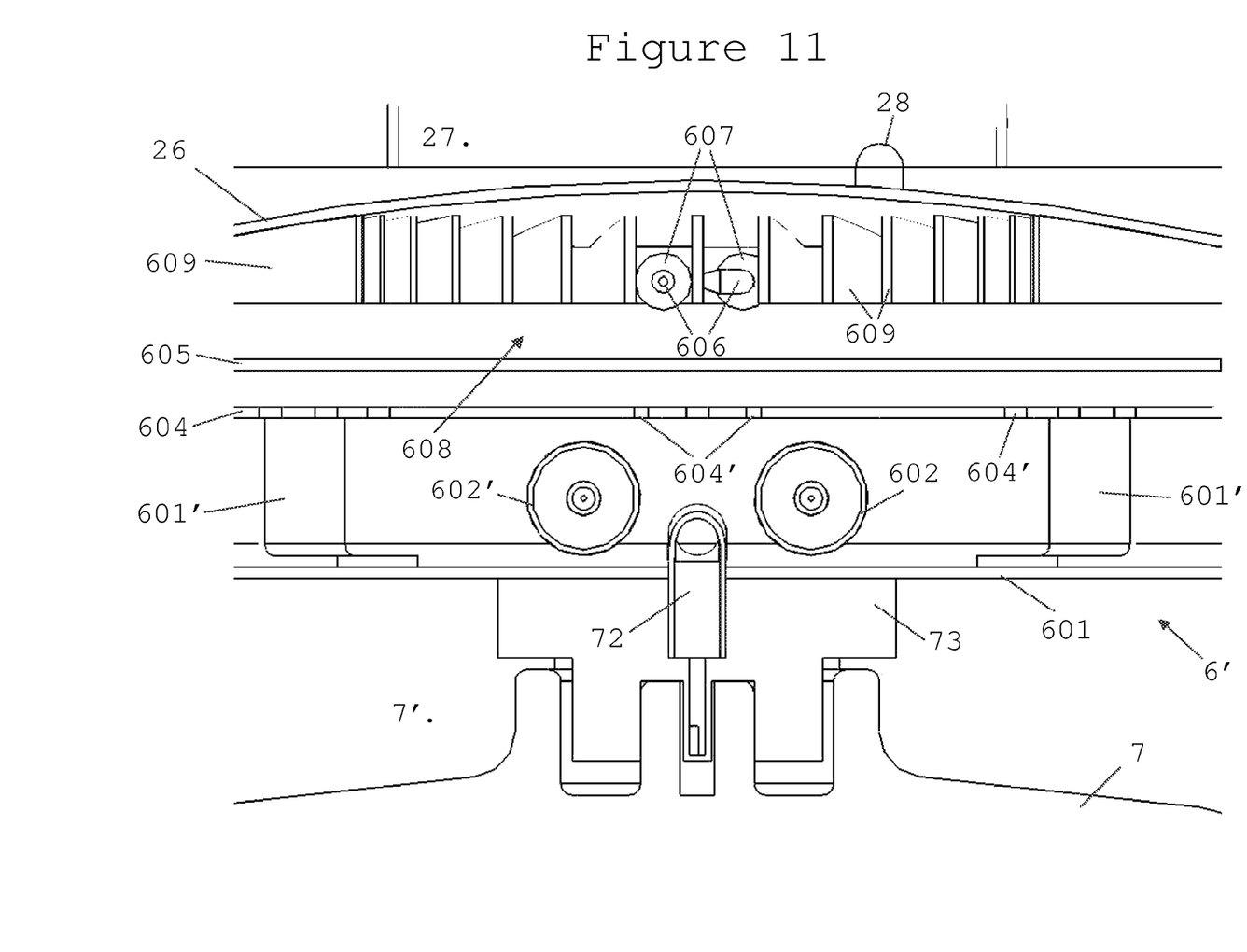
FIG. 11 shows an enlarged view of a detail A of FIG. 10.

Combustion heater 6' has a bottom 601 extending across housing 23 and a perforated plate 604 spaced thereabove by spacers 601'. Perforated plate 604 is arranged to promote the distribution of combustible flowing therethrough into a combustion area 608 located thereabove. A pair of tubes 602,602' extend into heater 6' between bottom 601 and plate 604 for the supply combustible from a source 7 of combustible via a conduit 72, valve arrangement 71' and conduit 75'.

Outside burner 6', tubes 602,602' have a series of peripheral openings 603 for the intake of air from lower cavity 7', housing 23 having a series of openings 25 for the circulation of air into the lower cavity.

During use, air is drawn into tubes 602,602' via openings 603 under the effect of the combustible flow in these tubes. Within tubes 602,602' combustible is then mixed with air to permit subsequent combustion. This mixture escapes from tubes 602,602' between bottom 601 and plate 604 and then distributed via perforated plate 604 in combustion area 608. A pair of facing ignition electrodes 606 protruding from protection sheaths 607 are arranged to ignite combustion in combustion area 608. Such electrodes 606 may be powered by batteries 51 and controlled by control unit 52 for igniting combustion whenever necessary.

Advantageously, control unit 52 is also connected to a combustion detector (not shown) associated with combustion area 608 so as to detect any combustion incident, e.g. unwanted extinction, and allow control unit 52 to take the appropriate corresponding steps, e.g. reignite combustion via electrodes 606 or interrupt combustible supply.

A series of generally upright L-shaped guide members 609 are arranged all around combustion area 608 and extend underneath vessel 2' and up between vessel 2' and housing 23. Guide members 609 delimit with vessel 2' and housing 23 a series of channels or chimneys for evacuating exhaust gases from combustion area 608 outside device 1' in such a manner as to maximise the heat transfer between exhaust the exhaust gases and vessel 2'.

Furthermore, through-openings 25' are provided in housing 23 at the level of these channels or chimneys to allow the intake of ambient air for avoiding overheating at the periphery of vessel 2', in particular when vessel 2' is only partly filled with liquid. However, in some embodiments and depending the intended use, it may be preferable to avoid such through-openings along the channels or chimneys, especially since these openings may allow an early escape of flames generated during preheating and reduce the heat transfer from the exhaust gases to vessel 2'.

In accordance with the invention, combustion heater 6' further comprises within and/or adjacent to combustion area 608 a catalytic device 605 for inhibiting flame formation by combustion of the combustible.

Catalytic device 605 may have a porous, foraminate, perforated or grid-like structure, in particular a plate-like structure, arranged for a flow of said combustible therethrough. Catalytic device 605 can have an active surface made of or comprising one or more noble metals as a catalyst, such as platinum or an alloy thereof. For instance, catalytic device 605 is integrally made of active material or has a core with a coating or layer of active material where exposed to a flow of combustible.

As illustrated in FIGS. 9 to 11, catalytic device 605 is located above plate 604 and is generally parallel thereto.

Typically, catalytic device 605 becomes active for inhibiting flame formation upon preheating thereof, for instance when it becomes incandescent. Hence, at start-up, when combustible is ignited in combustion area 608, flames will be formed above catalytic device 605. This initial combustion will heat up catalytic device 605 which, when the activation temperature is reached, will become active for the inhibition of combustion-formed flames. This will lead to a noise reduction of the combustion and allow larger supply of combustible to the combustion area 608 without risk of formation of flames that would escape via the evacuation chimneys or channels formed along vessel 2', and hence allow a safe increase of the heating power of the system.

For this purpose, the arrangement for supplying combustible to combustion area 608 may comprise a control means for supplying combustible to the combustion area 608 at a low rate during preheating of the catalytic device 605, when combusting still produces flames, and at a high rate upon preheating of the catalytic device 605, when combustion produces substantially no flames.

As shown in FIGS. 9 to 12, combustible tank 7 is on the one hand mechanically secured in cavity 7' to bottom 601 via connector 73 and has a fluid connection via pipe 72 to a valve arrangement 71'. This arrangement 71' includes a pair of parallel on-off valves connected on their inlet side to pipe 72 and on their outlet side to the parallel combustible supply tubes 602,602' via a common T-shaped connecting tube 75'. The flow in each supply tube 602,602' is about identical and controlled by control unit 52 via the corresponding valve of arrangement 71'.

Figure 12:
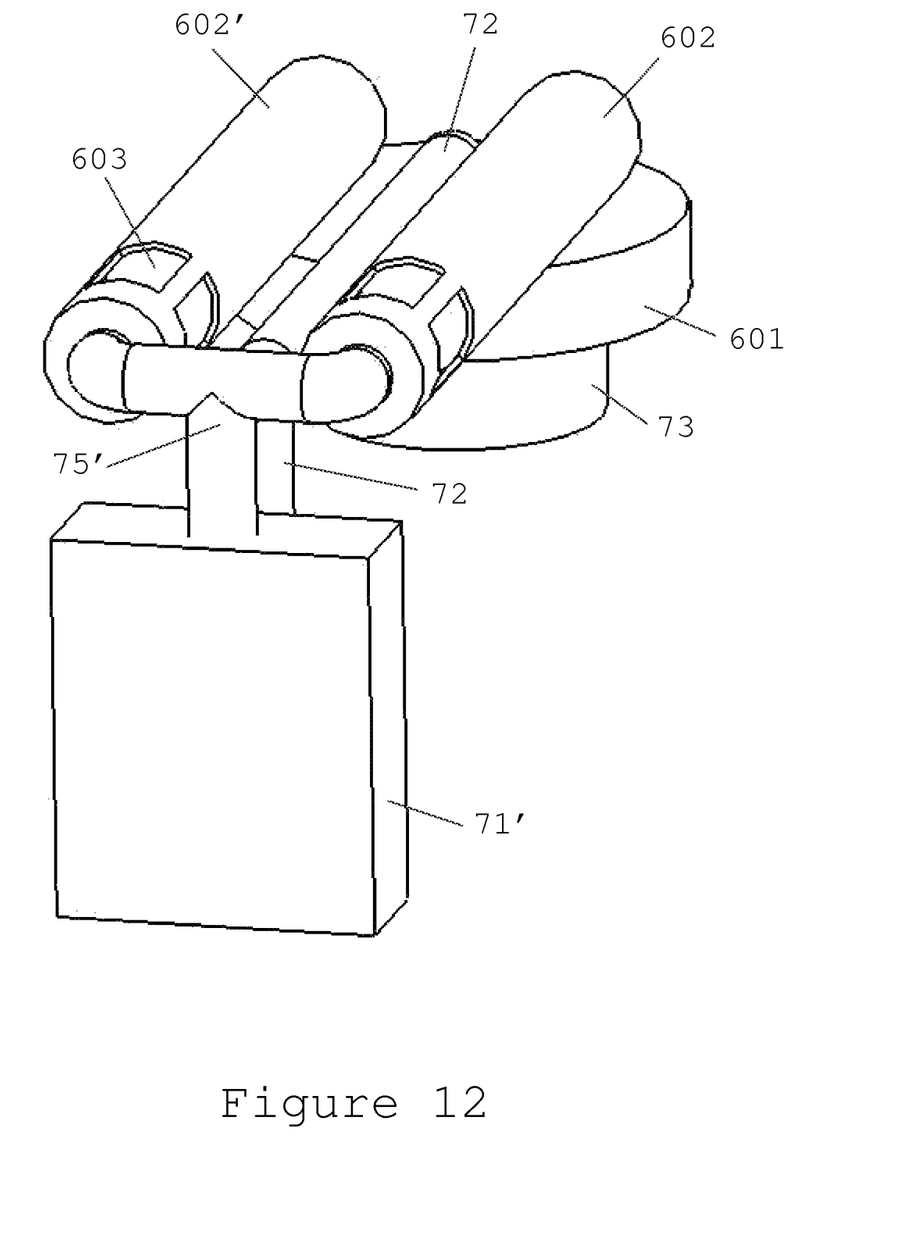
FIG. 12 shows a view of the combustible circulation arrangement of the heating device.

Hence, during preheating of catalytic device 605, only one valve of arrangement 71' will be opened for allowing combustible to be supplied at a reduced rate into combustion area 608. When the preheating of catalytic device 605 is complete both valves of arrangement 71' may be opened. It should be noted that these two valves may be dimensioned for providing different supply rates. For example, the valve opened during preheating may be dimensioned for providing a smaller supply rate than the other valve.

The preheating valve may be dimensioned to provide as much combustible as possible to combustion area 608 for a combustion which during preheating generates flames that however do not propagate out of housing 23. The second valve may be dimensioned to allow full capacity of combustion supply to combustion area 608 and is opened once catalytic device 605 is activated, i.e. during normal operation.

The second valve may be used also to adjust the heating profile during normal operation and may be intermittently opened or closed as needed to increase or reduce the amount of combustible supplied to combustion area 608.

This configuration for example may be of interest for fast heat up of the liquid contained in vessel 2', e.g. heating water to a predetermined temperature, in particular below its boiling point, for subsequent dispensing.

The preheating valve may be dimensioned to provide just enough combustible for maintaining the temperature of the liquid in vessel 2' and/or maintain continuous combustion in combustion area 608. The second valve may be used to adjust the heating profile during normal operation.

This configuration for example may be of interest when vessel 2' is used not merely to heat liquid but for cooking, e.g. non-instant soup that needs to be maintained for an extended period of time at a temperature closing to boiling.

To determine when the preheating is sufficient, heating device 1' may be arranged to assess the state of activation of catalytic device 605 by measuring directly or indirectly the temperature of catalytic device 605. This may be achieved by means of a temperature sensor, in particular a resistive-type sensor, that is for example incorporated in catalytic device 605 for a direct measure or in or against bottom 601 nearby catalytic device 605 for an indirect measure. For such configurations, this temperature sensor may be connected to control unit 52 which also controls the valves of valve arrangement 71'.

To simplify the architecture of heating device 1', in particular to avoid the need of a temperature sensor for measuring the temperature of catalytic device 605, the preheating duration may merely be evaluated by control unit 52 based on a more or less sophisticated predictive model implemented into control unit 52, e.g. derived from experimental results and, optionally, the actual history of use of device 1'. In particular, the length of a particular preheating period at low combustion supply rate may be set as a function of the time span from a previous heating cycle, the longer the time span between two consecutive heating cycles the longer the preheating period. In this case, the preheating period is maximal when the device is used for the first time for heating after having been switched on.

For certain applications, in particular the preparation of beverages such as coffee of tea, the temperature of the heated liquid should be specifically adjusted to the specific application and maintained within a relatively narrow span, say at a selected temperature level in a range below the boiling point of e.g. 35 to 95° C., in particular 65 to 90° C., within a maximum temperature deviation of +/−1, 2 or 3° C. around the selected temperature.

For this purpose, vessel 2' includes a temperature sensor 28, e.g. of the resistive type, on bottom 26 for measuring the temperature of the liquid, e.g. water, during heating thereof. Sensor 28 is connected to control unit 52 which in turn controls valve arrangement 71' so that the proper amount of combustible is supplied from tank 7 to combustion area 608 for the liquid to reach the selected temperature.

As mentioned above, heating device 1' shown in FIGS. 7 to 12 may be incorporated into a machine for preparing beverages such as coffee, tea or soups. For example, outlet 48 may be connected to a pump and lead to an extraction head of the type shown in FIG. 1 to form a beverage preparation system (not shown). Such system may further include an electric heater, in particular an in-line thermoblock or on-demand heater, before or after the pump. In a variation, the burner with the catalytic device may be mounted in-line either alone or in combination with an electric heater such as a thermoblock, in particular against the electric heater, for example as generally illustrated in FIGS. 3 to 5.

Heating device 1' illustrated in FIGS. 7 to 12, may be modified so that the combustible supply conduits are separately connected to a corresponding valve of the valve arrangement, each valve controlling separately the passage of combustible in the supply conduit connected thereto.

Alternatively, the combustion heating means may have only one combustible supply conduit extending into the combustion heater 6'. Such a combustible supply conduit may be connected to a variable control valve that is conceived for allowing the supply of combustible at different rates. In this case, during preheating, the flow rate via this valve may be gradually increased in accordance with the degree of activation of the catalytic device, when the catalytic device has a temperature-related progressive activity. Later on, during steady state operation, the adjustment of the combustible supply rate may be easily adjusted by controlling this valve, e.g. to provide an appropriate heating profile for the liquid in the vessel.

A single combustible supply conduit may be connected to an arrangement of a plurality of parallel on-off valves of the type similar to the arrangement 71' shown in FIG. 12. Such valve arrangement may then be connected via corresponding converging connecting tubes to the same combustible supply conduit.

Moreover, for a finer adjustment of the supply rate, it is possible to increase the number of valves. However, it is also possible, with a small number of on-off valves to adjust the heating power over time by intermittently commuting at least one on-off valve.

It is of course also possible to increase the number of supply conduits that extend into the burner.

What is claimed is:

1. A device for preparing a hot beverage, comprising:
a liquid supply;
an extraction or infusion head that contains a beverage forming ingredient;
an arrangement for circulating liquid from the liquid supply to the beverage forming ingredient in the extraction or infusion head for contact therewith to form a hot beverage that is dispensed from a beverage supply exit;
a combustion heater for supplying combustion heat to the liquid that is circulated from the liquid supply to the extraction or infusion head and the supply exit;
an electric heater for supplying electric heat to the liquid that is circulated from the liquid supply to the extraction or infusion head and the supply exit; and
a heat regulator configured to regulate the heat supplied to the liquid from the combustion heater and the electric heater, the heat regulator comprising a temperature sensor which is arranged to measure directly or indirectly the temperature of the heated liquid for comparing the measured temperature with a target temperature, the electric heater and the combustion heater are arranged to adjust at least one of the supply of the electric heat or the combustion heat based on the difference between the measured temperature and the target temperature,
the heat regulator further comprising a control unit that is configured to operate (i) in a first mode in which the combustion heater supplies combustion heat to the circulating liquid while the electric heater does not supply the electric heat to the circulated liquid, (ii) in a second mode in which the electric heater supplies electric heat to the circulating liquid while the combustion heater does not supply the combustion heat to the circulating liquid, and (iii) in a third mode in which the combustion heater supplies the combustion heat and the electric heater supplies the electric heat simultaneously to the circulating liquid.

2. The device of claim 1, wherein the electric heater comprises a thermoblock having a metal-based body with a through passage for the circulation of the liquid and one or more resistances for supplying electric heat to the metal-based body.

3. The device of claim 2, wherein the metal-based body has a generally tubular shape with a generally helicoidal through passage for the circulation of liquid, and the combustion heater is arranged to supply heat to the liquid via the metal-based body of the thermoblock.

4. The device of claim 1, wherein the temperature sensor is associated with the electric heater such that the temperature sensor is arranged to measure directly or indirectly the temperature of the heated liquid, with the electric heater being arranged to:
compare the measured temperature with a target temperature; and
adjust the supply of the electric heat based on the difference between the measured temperature and the target temperature,
wherein the combustion heater is arranged to supply an amount of combustion heat to the liquid which is below the heat required for the liquid to reach the target temperature.

5. The device of claim 1, wherein the temperature sensor is associated with the combustion heater such that the temperature sensor is arranged to measure directly or indirectly the temperature of the heated liquid, the combustion heater being arranged to:

compare the measured temperature with a target temperature; and adjust the supply of the combustion heat based on the difference between the measured temperature and the target temperature, wherein the electric heater is arranged to supply electric heat to the liquid which is below the heat required for the liquid to reach the target temperature.

6. The device of claim 1, wherein the temperature sensor is associated with both the electric heater and the combustion heater, with the temperature sensor arranged to measure directly or indirectly the temperature of the heated liquid, and with the electric heater and the combustion heater arranged to:

compare the measured temperature with a target temperature; and adjust the supply of the electric heat or combustion heat based on the difference between the measured temperature and the target temperature.

7. The device of claim 1, wherein the electric heater and the combustion heater are configured or configurable so that:

the electric heater and the combustion heater supply heat simultaneously to the liquid; or only one of the electric heater and the combustion heater supplies heat to the liquid at a particular time, or the electric heater and the combustion heater sequentially supply heat to the liquid.

8. The device of claim 1, wherein the combustion heater comprises a combustible supply arrangement for supplying combustible material to a burner for consuming the combustible material, and the combustion heater comprises a valve between the combustible supply arrangement and the burner for controlling the supply of combustible material from the supply arrangement to the burner.

9. The device of claim 8, wherein the valve is a variable valve or an on-off valve and wherein the combustion heater is associated with an ignition and a heat regulator configured to regulate its heat supply, with the heat regulator arranged to control the valve.

10. The device of claim 6, wherein the arrangement for circulating a liquid comprises a pump, and the device is powered with (i) an electric current supply that includes at least one of a battery-type low voltage supply and (ii) the mains, with the electric heater powered by the mains and with the combustion heater powered by the battery-type low voltage supply.

11. The device of claim 1, wherein the combustion heater comprises an arrangement for supplying combustion from a source of combustible material to a combustion area; and wherein the combustion heater further comprises within or adjacent to the combustion area a catalytic device for inhibiting flame formation by combustion of the combustible in the combustion area.

12. The device of claim 11, wherein the catalytic device becomes active for inhibiting flame formation upon preheating, with the arrangement for supplying combustible material to the combustion area comprising a control valve for supplying combustible material to the combustion area at a lower rate during preheating of the catalytic device and at a higher rate upon preheating of the catalytic device.

13. The device of claim 12, further comprising a housing containing the combustion area and one or more passages for evacuating combustion gases from the combustion area to outside the housing, with the lower rate being such that combustion flames generated during preheating of the catalytic device are inhibited from extending outside the housing via the passages.

14. The device of claim 13, further comprising a temperature sensor which is arranged to measure directly or indirectly a temperature of the catalytic device to monitor its activity.

15. The device of claim 13, which is arranged to estimate by a predictive model a temperature of the catalytic device so as to monitor its activity.

16. The device of claim 11, wherein the combustion heater comprises at least one combustible material supply conduit associated with at least one control valve to adjust a rate of supply of combustible material to the combustion area via the supply conduit, with the control valve comprising a variable valve.

17. The device of claim 11, wherein the combustion heater comprises a plurality of combustion material supply conduits, each conduit being associated with a corresponding control valve comprising one or more on-off control valves.

18. The device of claim 11, wherein the combustion heater comprises a plurality of combustion material supply conduits having inlet sides that are in fluid connection, the inlet sides being associated with a plurality of parallel control valves.

19. The device of claim 11, wherein the catalytic device has a porous, foraminate, perforated or grid-like structure arranged for a flow of the combustible material therethrough and includes an active surface made of or comprising one or more noble metals as a catalyst.

20. The device of claim 1, which is powered with (i) an electric current supply that includes a battery-type low voltage supply and (ii) the mains, with the electric heater powered by the mains and with the combustion heater powered by the battery-type low voltage supply.

21. A device for preparing a hot beverage, the device comprising:

a liquid supply;

an extraction or infusion head;

an arrangement for circulating liquid from the liquid supply to the extraction or infusion head for contact a beverage forming ingredient therein to form a hot beverage that is dispensed from a beverage supply exit;

a combustion heater configured to supply combustion heat to the circulating liquid;

an electric heater configured to supply electric heat to the circulating liquid; and a heat regulator configured to regulate the combustion heat supplied to the circulating liquid from the combustion heater and the electric heat supplied to the circulating liquid from the electric heater, the heat regulator comprising (i) a temperature sensor arranged to measure directly or indirectly the temperature of the heated liquid, and (ii) a control unit that is configured to compare the measured temperature with a target temperature;

wherein at least one of the combustion heater or the electric heater is associated with the heat regulator, the device having an arrangement selected from the group consisting of:

(i) the combustion heater is configured to adjust the supply of the combustion heat based on the difference between the measured temperature and the target temperature, the electric heater is configured to supply an amount of the electric heat to the circulating liquid which is below the heat required for the circulating liquid to reach the target temperature, and the reminder of the heat required for the circulating liquid to reach the target temperature is supplied by the combustion heater simultaneously or sequentially; and (ii) the electric heater is configured to adjust the supply of the electric heat based on the difference between the measured temperature and the target temperature, the combustion heater is configured to supply an amount of the combustion heat to the circulating liquid which is below the heat required for the circulating liquid to reach the target temperature, and the reminder of the heat required for the circulating liquid to reach the target temperature is supplied by the electric heater simultaneously or sequentially.

* * * * *